United States Patent [19]

Solyntjes

[11] Patent Number: 4,732,271
[45] Date of Patent: Mar. 22, 1988

[54] CANISTER AND LIGHT SEALING, ANTI-BLOOMING TAB

[75] Inventor: Alan J. Solyntjes, Minneapolis, Minn.

[73] Assignee: Minnesota Mining and Manufacturing Company, St. Paul, Minn.

[21] Appl. No.: 811,815

[22] Filed: Dec. 20, 1985

[51] Int. Cl.⁴ ............................................. B65D 85/38
[52] U.S. Cl. .................................. 206/316; 206/395; 206/416
[58] Field of Search ............... 206/316, 395, 396, 397, 206/398, 399, 400, 407, 413, 414, 415, 416

[56] References Cited

U.S. PATENT DOCUMENTS

| | | | |
|---|---|---|---|
| 1,828,955 | 10/1931 | Bornmann | 206/316 |
| 2,626,705 | 1/1953 | Ash | 206/316 |
| 3,457,075 | 7/1969 | Morgan et al. | 96/67 |
| 3,532,210 | 10/1970 | Minion et al. | 206/52 |
| 3,752,413 | 8/1973 | Caruso | 206/316 |
| 3,756,392 | 9/1973 | Oehlmann | 206/59 E |
| 3,944,148 | 3/1976 | Freeman et al. | 242/55.53 |
| 4,034,891 | 7/1977 | Mecham | 220/339 |
| 4,179,028 | 12/1979 | Stemme et al. | 206/316 |
| 4,212,389 | 7/1980 | Robbins | 206/316 |
| 4,239,164 | 12/1980 | Barnsbee et al. | 242/55.53 |
| 4,244,254 | 1/1981 | Fish | 206/407 |
| 4,291,802 | 9/1981 | Buelens | 206/409 |
| 4,296,857 | 10/1981 | Huck | 206/53 |
| 4,302,102 | 11/1981 | Stark et al. | 355/72 |
| 4,398,814 | 8/1983 | Muylle et al. | 354/275 |
| 4,403,845 | 9/1983 | Buelens et al. | 354/275 |
| 4,431,139 | 2/1984 | Barnsbee et al. | 242/55.53 |
| 4,505,387 | 3/1985 | Seto | 206/316 |

Primary Examiner—Joseph Man-Fu Moy
Attorney, Agent, or Firm—Donald M. Sell; James A. Smith; David W. Anderson

[57] ABSTRACT

A light-tight, self-contained canister and light sealing, anti-blooming tab, of generally rectangular shape, for preventing a roll of core wound photosensitive media, containable within the canister and used in a microfiche or microfilm reader-printer, from being damaged or exposed to actinic light during shipping and storage. The canister includes an open-ended, opaque tubular sleeve having an exit slot, and the sleeve is closed at both ends by opaque end caps fastened thereto. The tab includes an insertable portion joined along a fold line to an extendable portion. The insertable portion may be inserted into the exit slot and engageably wedged between the roll of core wound photosensitive media and the sleeve to prevent undesired rotation. In addition, the extendable portion of the tab is folded at the fold line along the exit slot. Further, the extendable portion includes two outer edge flaps which may be folded and inserted between the end cap outer edges and the sleeve to prevent the end portion of the media from being pulled back into the canister where it would become inaccessible. Thus, the tab light seals the exit slot and can be easily removed by grasping and pulling it.

3 Claims, 6 Drawing Figures

CANISTER AND LIGHT SEALING, ANTI-BLOOMING TAB

FIELD AND BACKGROUND OF THE INVENTION

The present invention relates to a disposable canister, and more particularly to a light-tight canister for protecting a roll of core wound photosensitive media, containable therein, from being damaged or exposed to actinic light.

In the operation of a microfiche or microfilm reader-printer of, for example, the type illustrated in U.S. Pat. No. 4,302,102, a photosensitive media is fed from a roll as needed during production of enlarged copies of preselected images of the micofiche or microfilm. Because of the difficulty in loading reader-printers in lighted areas, they are capable of accepting preloaded light-tight canisters. These preloaded canisters, of the type illustrated in U.S. Pat. Nos. 4,431,139, 4,291,802, 3,756,392 and 3,532,210, are placed in the reader-printer and the photosensitive media is dispensed therefrom as needed while the canister prevents the unused portion of the media from being exposed. However, there are several problems and limitations associated with such prior canisters.

One particular problem has been associated with the undesired rotation of the roll of media, including blooming, during shipping and storing which can result in tearing, folding or other damage to the media. One specific attempt to prevent the problems associated with blooming has been by providing a locking member that co-operates with the core of the roll and the wall of the canister. The locking member has a weakened zone which can be ruptured by the torsional force applied to the locking member when the user starts pulling the media from the canister, as illustrated in U.S. Pat. Nos. 4,403,845 and 4,398,814. However, a canister utilizing such a locking member is difficult and time consuming to assemble in a red-light room or darkroom.

In addition to the above, contamination of the photosensitive media by actinic light entering the exit slot has been a problem. Several approaches have been proposed in an attempt to solve this problem, namely that the exit slot be formed of mated, curved lips, as illustrated in U.S. Pat. Nos. 4,291,802 and 4,239,164, or that a strip of material be applied across the exit slot, as illustrated in U.S. Pat. No. 3,532,210, or that a plush be placed along the exit slot, as described in U.S. Pat. No. 4,239,164. However, both canisters utilizing these proposals require additional time to assemble either in a red-light room or darkroom, or subsequently outside of it subjecting the media to possible exposure. In addition, neither prevents blooming of the media.

Another problem associated with prior canisters is that of media accessibility. In one such canister, the end of the core wound media extends out of the canister through the exit slot and is attached to the exterior of the canister by adhesive tape or the like to prevent it from being pulled into the canister where it would become inaccessible, as illustrated in U.S. Pat. No. 3,532,210. However, the use of such adhesives and the like make the canister more difficult and time consuming to assemble in either a red-light room or darkroom, or subsequently outside of it increasing the possibility of the extending portion of the media becoming inaccessible.

The canisters as discussed above do not describe a canister including a light sealing, anti-blooming tab which can be assembled and preloaded in a red-light room or darkroom with a minimum of difficulty, and which prevents the extending end portion of the media from being pulled back into the canister where it would become inaccessible.

SUMMARY OF THE INVENTION

The invention described herein contemplates a canister, specifically a light-tight canister having a light sealing, anti-blooming tab for protecting a roll of core wound photosensitive media, containable therein. The canister is used in microfiche or microfilm reader-printers to dispense the media therefrom as needed, and to protect the media from physical damage and exposure to actinic light during shipping and storing. The canister includes an open ended opaque tubular sleeve having two opaque end caps fastened to each end thereof, and a media exit slot running the length of the sleeve. The tab is of generally rectangular shape, and includes an insertable portion and an extendable portion joined along a fold line to the insertable portion. The insertable portion of the tab may be inserted into the exit slot and engageably wedged between the roll of media and the sleeve to prevent undesired rotation of the roll of media, including blooming, during shippage and storage. In addition, the extendable portion of the tab may be folded along the exit slot at the fold line to light seal the exit slot at the fold line and prevent the tab from being pulled into the canister. Further, the extendable portion of the tab includes two outer edge flaps which may be folded and tucked between the end caps and the sleeve to removably maintain the tab in the exit slot. Thus, the tab light seals the exit slot, and can be easily removed by grasping and pulling the edge of the extendable portion of the tab overlying the exit slot. Also the tab secures the end portion of the media extending from the exit slot between the tab and the canister to prevent it from being pulled into the canister where it would become inaccessible.

DESCRIPTION OF THE DRAWINGS

The present invention will be more fully described with reference to the accompanying drawings where like reference numerals identify corresponding components, and.

DETAILED DESCRIPTION OF THE PREFERRED EMBODIMENT

Figure 1:
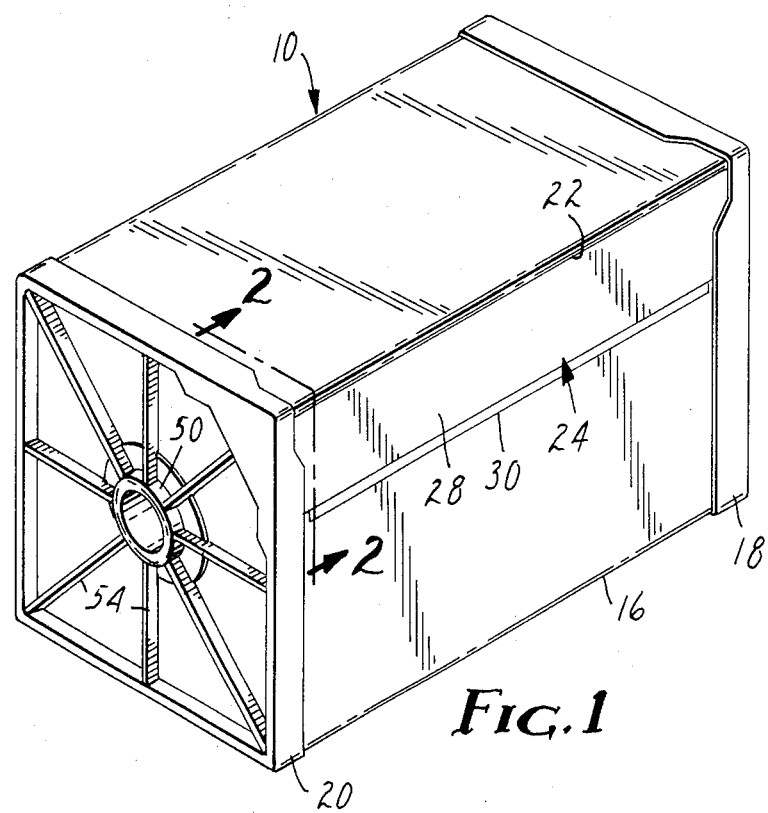
FIG. 1 is a perspective view of a canister and tab constructed in accordance with the present invention.
Figure 2:
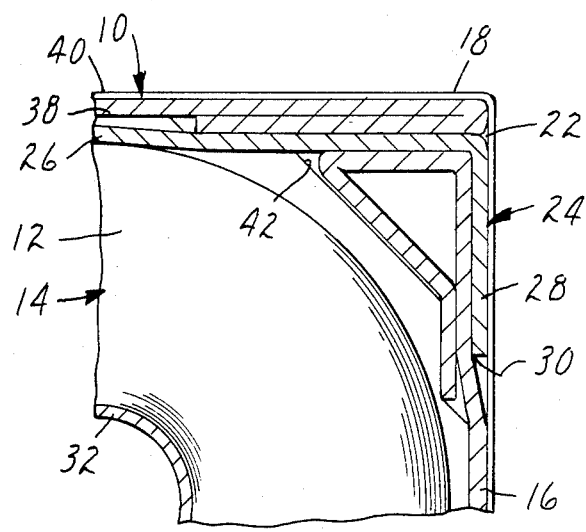
FIG. 2 is an enlarged cross-sectional view of a portion of the canister of FIG. 1 taken in the direction of arrows 2—2.
Figure 3:
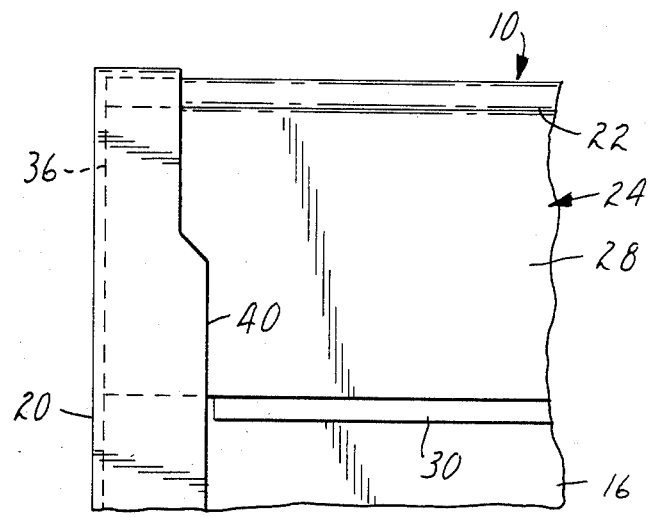
FIG. 3 is an enlarged, fragmentary elevational view of the canister.
Figure 4:
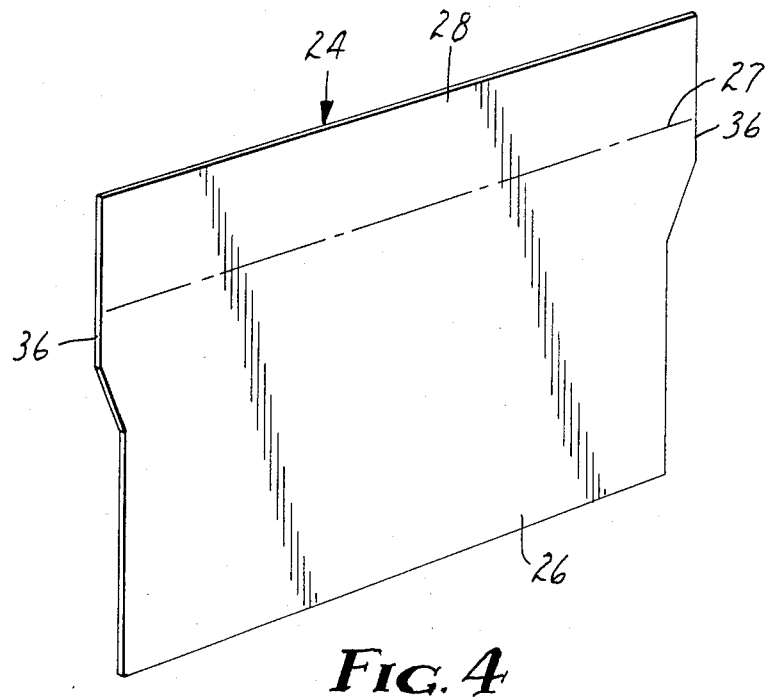
FIG. 4 is a perspective view of the tab.

Referring to FIGS. 1 and 2 of the drawings, a disposable light-tight canister, generally designated 10, is used in connection with conventional microfiche and microfilm reader-printers for dispensing a photosensitive media 12 from a roll 14 containable therein. The canister 10 includes an open-ended, opaque tubular sleeve 16 closed at both ends by two opaque end caps 18 and 20 fastened thereto. A media exit slot 22 extends the length of the sleeve 16 through which the media 12 is dispensed. A light sealing, anti-blooming tab 24 of generally rectangular shape includes an insertable portion 26 joined along a fold line 27 to an extendable portion 28 of increased width. The insertable portion 26 may be inserted into the exit slot 22 and engageably wedged between the roll 14 of media 12 and the sleeve 16 to prevent undesired rotation, including blooming (i.e. roll diameter increase due to unwinding), during handling. In addition, the extendable portion 28 of the tab 24 may be folded along the fold line 27 at the exit slot 22 to light seal the exit slot and to prevent the tab 24 from being drawn into the canister 10. In addition, by folding the tab 24, the extendable portion 28 can be grasped and pulled for easy removal, as illustrated in FIGS. 2, 3 and 4. Further, by folding the tab 24, the end portion 30 of the media 12 is secured between the tab 24 and sleeve 16, and prevented from being pulled into the canister 10 where it would become inaccessible.

The particular photosensitive media 12 does not form a part of the present invention and may include a roll 14 of media 12 wound around a hollow core 32 and having a width less than the length of the exit slot 22. A suitable media is dry silver paper, of the type supplied by Minnesota Mining and Manufacturing Company (3M), identified by product No. 795, and disclosed in U.S. Pat. No. 3,457,075. Such media has a thermally developable coating on one side of a suitable backing. The coating is comprised of a combination of photosensitive silver halide and light-stable organic silver salt in conjunction with a reducing agent. The description of the present canister 10 and its use will proceed on the basis of this particular media. It is to be understood that the invention is generally applicable to any flexible media.

The canister sleeve 16 and the tab 24 can be made from any one of a variety of suitable opaque materials such as a polymeric material, fiberboard, or corrugated paperboard which possess the desired puncture, compression, and burst strength. In the preferred embodiment, the sleeve 16 is made from a blank of corrugated paperboard scored to facilitate folding, and folded or bent into a tube with two open ends and the exit slot 22 formed by the joining edges of the blank. Similarly, the tab 24 is preferably made from a blank of corrugated paperboard scored to facilitate folding. However, the sleeve 16 and/or the tab 24 may be made by extruding a suitable polymeric material, such as polyvinyl chloride or polyethylene. It is only required that the material be opaque to prevent exposure of the media 14 when a photosensitive media is contained within the canister 10.

The particular design of the end caps 18 and 20 is not essential to the present invention and they may be permanently fastened to the sleeve 16 by any suitable fastening means well known to those skilled in the art, such as, for example, gluing, welding, hot melting, stapling, or other fastening means. However, it is preferred that end caps 18 and 20 be resiliently interconnected as disclosed in U.S. patent application Ser. No. 811,830, filed Dec. 20, 1985, by James R. Espy, and assigned to the assignee of this application, the disclosure of which is hereby incorporated by reference. The description of the present canister 10 and its use will proceed on the basis of this preferred means utilizing a tie bar 34 as illustrated in FIGS. 5 and 6.

In the preferred embodiment, tab 24 also includes two outer edge flaps 36 which may be folded and inserted between the end caps 18 and 20, and sleeve 16 to secure the tab 24 in the exit slot 22, as illustrated in FIGS. 3 and 4. To provide for this, each end cap includes an inner 38 and outer 40 peripheral flange to define a peripheral groove for receiving each end of the sleeve 16 and the outer edge flaps 36, as illustrated in FIGS. 2, 3, 4 and 5. In addition, each end cap 18 and 20 includes an exit slot accommodating portion 42 for receiving the inwardly folded portion of outer edge flaps 36 of the tab 24.

The sleeve 16 may also include a plush light seal of velvet, felt or other suitable material, not shown, which will not mar or blemish the media 12 when dispensed through the exit slot 22. The plush may be adhered along the exit slot 22 so that the plush will contact the uncoated side of media 12 to prevent maring or blemishing of the more sensitive coated side of the media.

Figure 5:
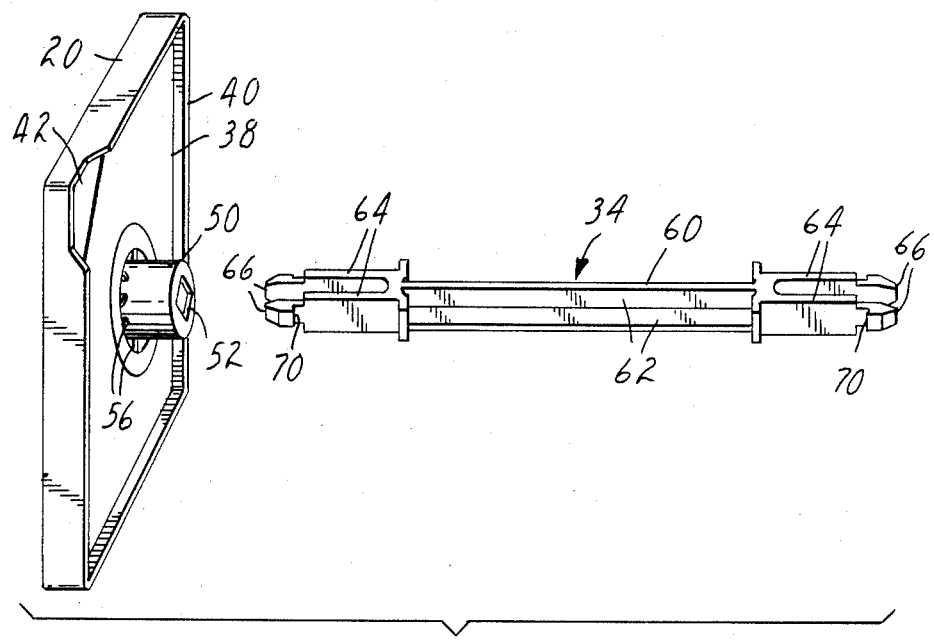
FIG. 5 is an exploded, perspective view of an end cap and a tie bar of a canister.
Figure 6:
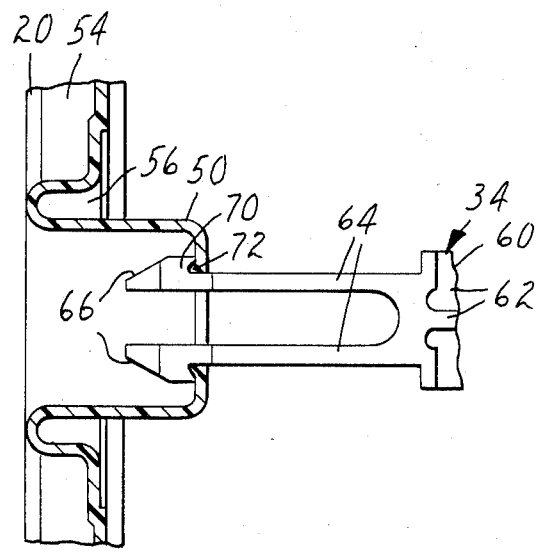
FIG. 6 is an enlarged, fragmentary, cross-sectional view showing the details of the end cap and tie bar interconnection.

As illustrated in FIGS. 5 and 6, each end cap 18 and 20 includes a central hub portion 50 which extends from the end cap into the interior of the sleeve 16. A central receiving aperture 52 is formed in the most inward part of the central hub portion 50 for receiving the tie bar 34. To provide strength and rigidity, each end cap includes a plurality of exterior radial stiffening ribs 54 extending from the central hub portion 50. In addition, a plurality of interior radial stiffening ribs 56 may be provided. Further, a core centering guide 58 may be provided in the interior of the end cap which retainingly receives the core 32 of the roll 14 of media 12.

The tie bar 34 includes a central shaft portion 60 having a plurality of stiffening ribs 62 radiating from its center. A pair of resilient fingers 64 project from both ends of the central shaft portion 60. Each finger 64 includes a truncated, inclined end portion 66 to facilitate inward deformation of the fingers 64 upon pressure engagement with the central receiving aperture 52 of the hub portion 50. In addition, each truncated, inclined end portion 66 of tie bar 34 includes a detent 70 which lockingly engages a corresponding rim 72 projecting about the peripheral edge of the aperture 52 to lock the resilient fingers 64 in the aperture after they spring back.

The end caps 18 and 20, and tie bar 34 may be made from a variety of suitable materials and manufactured by several manufacturing processes well known to those skilled in the art. In the preferred embodiment, the end caps 18 and 20, and the tie bar 34 are injection molded of a polymeric material. It is only required that the material be opaque to prevent exposure of the media 12, and somewhat resilient to allow deformation of the fingers 64 of the tie bar 34.

Assembly and Use

The assembly and use of the light sealing, anti-blooming tab 24 of the present invention will now be explained. Initially the canister 10 is assembled with the end portion 30 of the roll 14 of photosensitive media 12 extending from the exit slot 22. Then, the insertable portion 26 of the tab 24 is inserted into the exit slot 22 and wedged between the roll 14 of media 12 and the sleeve 16 to prevent undesired rotation of the roll 14 of media 12 during handling. Next, the extendable portion 28 of the tab 24 is folded along the fold line 27 at the exit slot 22 to light seal the exit slot 22 and prevent the tab 24 from being drawn into the canister 10. Then, the outer edge flaps 36 are folded and inserted between the outer peripheral flange 40 of the end caps 18 and 20 to retain the tab in the exit slot 22 and to prevent the end portion 30 of the media 12 from being pulled into the canister 10 where it would become inaccessible. The tab 24 is easily removed from the exit slot 22 by grasping and pulling the extendable portion 28 of the tab overlying the end portion 30 of the media 12. The tab 24 may be removed before or after the preloaded canister 10 is inserted into a reader-printer depending upon the design of the reader-printer.

It should be appreciated that the canister 10 of the present invention can be utilized with any imaging system, such as, for example, copiers, printers, reader-printers, and the like, which require a photosensitive media.

While the preferred embodiment of the present invention has been described so as to enable one skilled in the art to practice the device of the present invention, the preceeding description is intended to be exemplary and should not be used to limit the scope of the invention. The scope of the invention should be determined only by reference to the following claims.

I claim:

1. A light-tight, self-contained canister for a roll of core wound photosensitive media, said canister being constructed to restrict said media from being damaged or exposed to actinic light during shipping, storing and dispensing, said canister comprising:

a tubular sleeve having two outer edges and a media exit slot extending the length of said sleeve parallel to the central axis of said roll of core wound photosensitive media, said sleeve having inner walls closely adjacent the outer wrap of said roll of core wound media;

two opposed end caps engageable with the outer edges of said sleeve and each having a peripheral edge and a central hub portion, said central hub portion being engageable with the core of said core wound media for permitting free rotation of said core wound media within said sleeve during dispensing;

each of said hub portions extending longitudinally from said end cap toward the opposed end cap along the central axis of said core wound media;

fastening means for light sealably fastening said end caps to said outer edges of said sleeve; and removable tab means positioned in said sleeve exit slot and extending into said sleeve to wedge between said sleeve and said roll of core wound media and in pressure engagement with said roll of core wound media and said sleeve for light sealing said exit slot and for preventing undesired rotation of said core wound media.

2. The canister defined in claim 1 wherein said end caps further include a peripheral flange on the peripheral edge of each of said end caps for receiving the outer edges of said sleeve.

3. The canister defined in claim 2 wherein said tab means is folded at a fold line along said exit slot to light seal said exit slot and to prevent an end portion of said roll of core wound photosensitive media extending through said exit slot from being pulled back into said sleeve where it would become inaccessible, and said tab means includes two outer edge flaps engageable one with each of said end caps and said sleeve adjacent an outer edge so that said tab means is removably retained in said exit slot by said peripheral flange of said end caps.

* * * * *